United States Patent Office 2,760,420
Patented Aug. 28, 1956

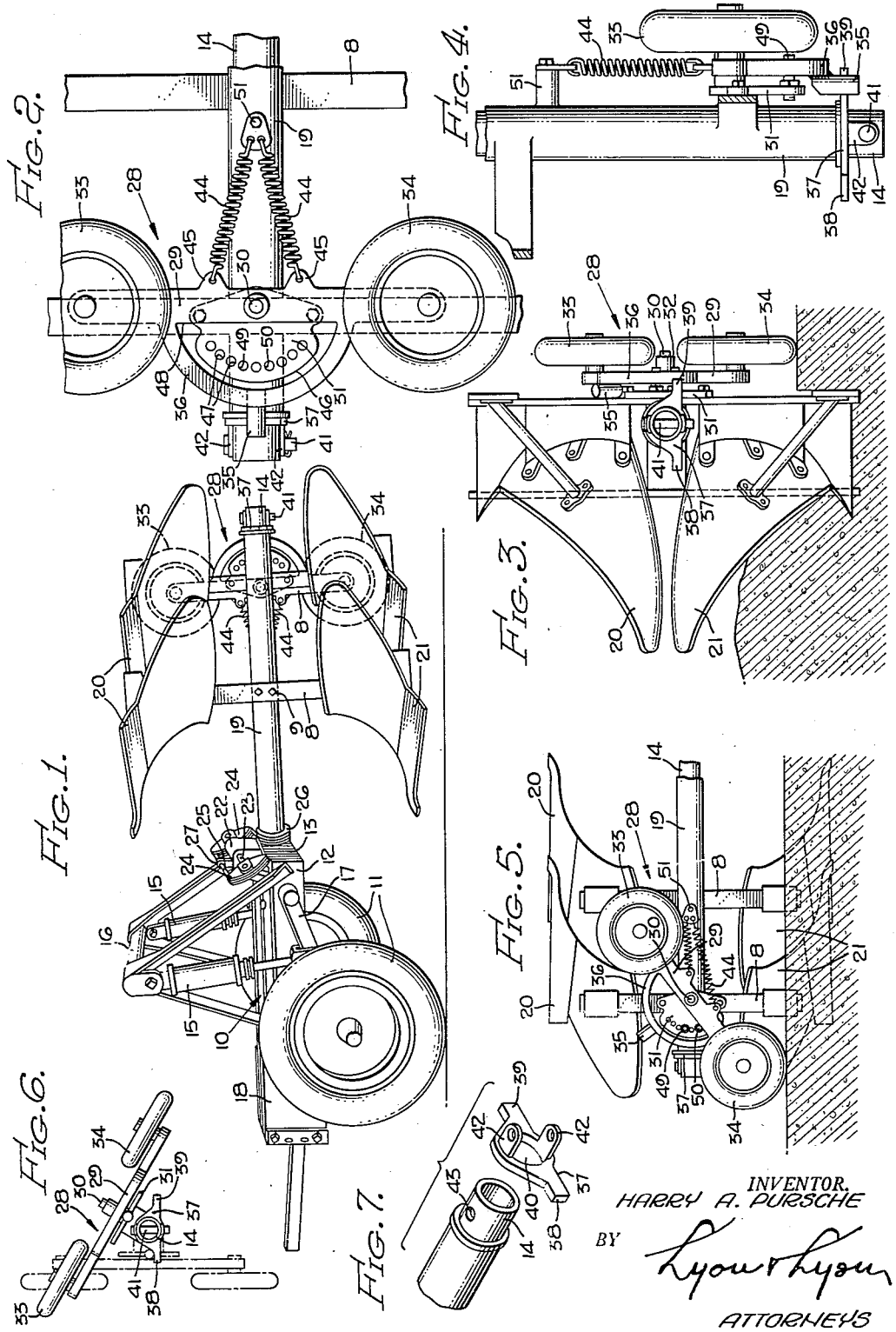

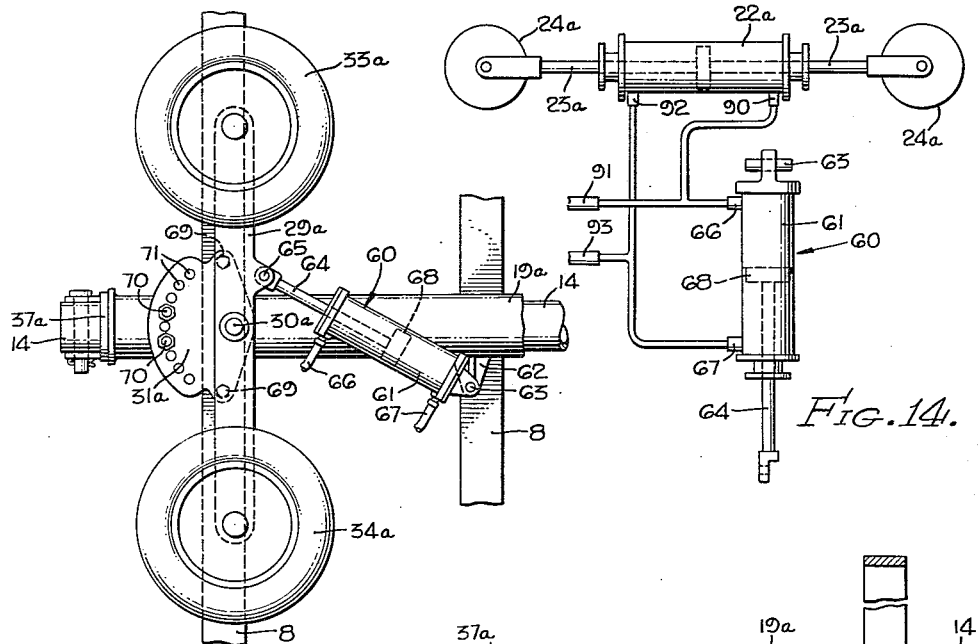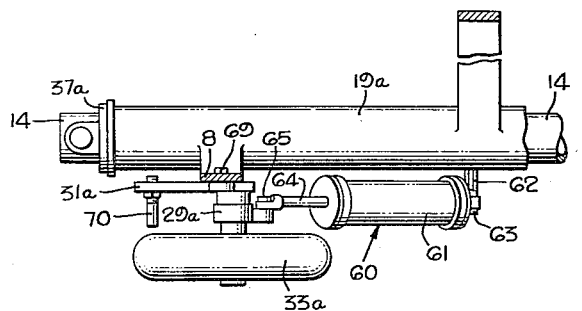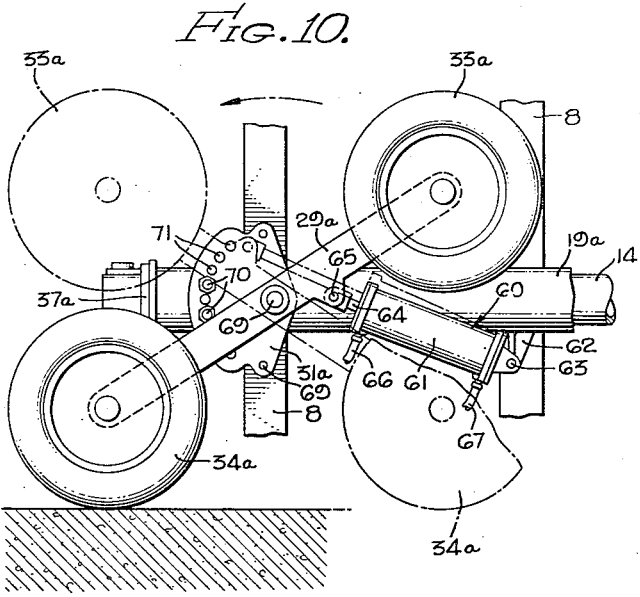

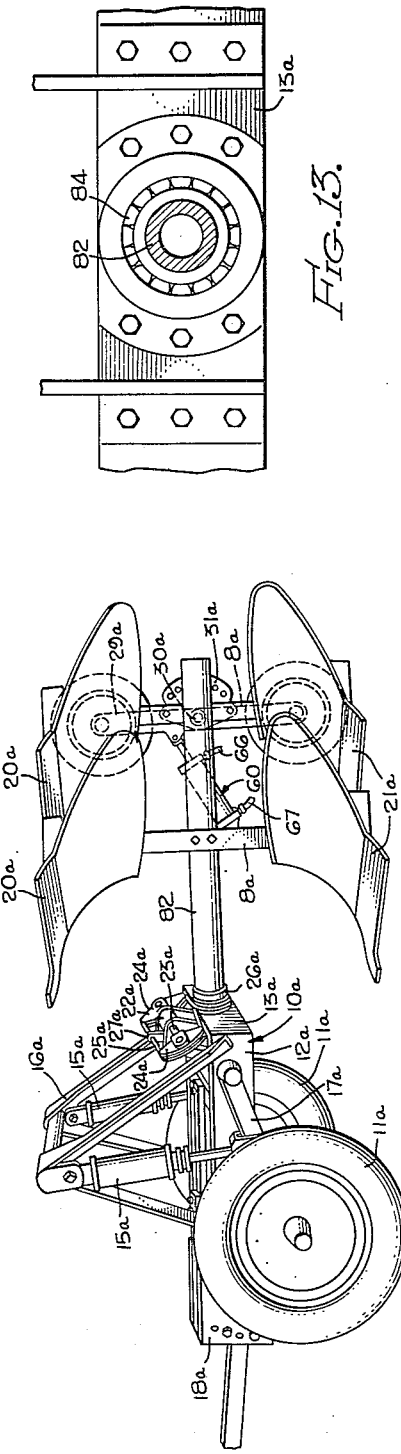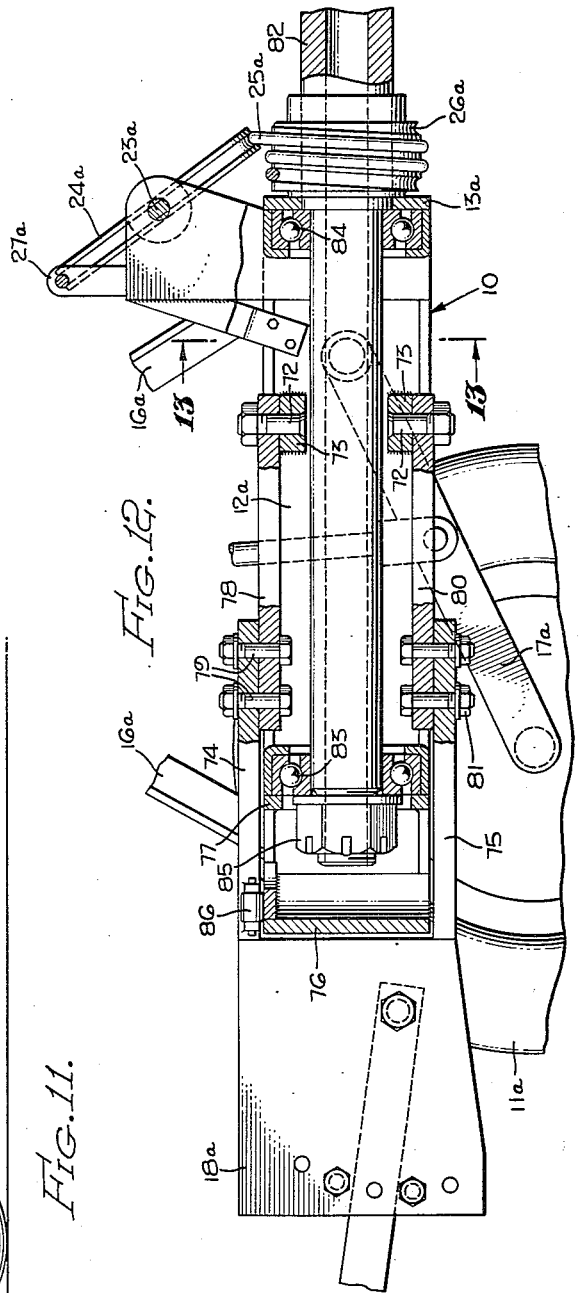

2,760,420

REAR WHEEL ASSEMBLY FOR TWO-WAY PLOW

Harry A. Pursche, Gardena, Calif.

Application August 11, 1951, Serial No. 241,464

8 Claims. (Cl. 97—26)

This invention relates to depth-regulating devices for plows and is particularly directed to improvements in a depth-regulating rear wheel assembly for a two-way plow.

This invention relates to improvements over the devices shown in my copending applications, Serial No. 760,846, for Two Way Plow, filed July 14, 1947, now Patent No. 2,625,090; Serial No. 38,352, for Two Way Plow, filed July 12, 1948, now Patent No. 2,659,284, and Serial No. 109,090, for Two Way Plow Construction, filed August 8, 1948, now Patent No. 2,655,851.

Two-way plow devices commonly are carried on a separate mobile frame and pulled by means of a tongue from a towing vehicle, such as a tractor. Other forms of two-way plow assemblies are carried directly on the tractor and do not have an independent wheel-supported frame. In either style it may be necessary or desirable to employ a rear wheel assembly for regulating the depth of cut taken by the plows. In my copending applications, referred to above, I have shown rear wheel assemblies mounted on the plow carrier and arranged to roll on unplowed ground. The position of the rear wheel relative to the carrier may be adjusted to control the depth of cut. Rear wheel assemblies of the type shown in my copending applications have been found to be satisfactory when relatively deep cuts are made, but it has been found that when it is desired to use the two-way plow device for very shallow cuts, a very large diameter rear wheel must be employed. Such a wheel may be too heavy and cumbersome.

It is the principal object of the present invention to provide a rear wheel assembly for a two-way plow having the advantages described in my copending applications and yet which does not require an especially large rear wheel for shallow plowing operations.

In accordance with my invention, I provide a swinging beam which is pivoted on the turnable carrier for the plows and I mount a ground wheel at each of the opposed ends of this swinging beam. One of the ground wheels is in operation while the right hand plow is engaging the soil and the other of the ground wheels is in operation when the left hand plow is engaging the soil. The depth control is achieved by regulating the maximum angle to which the swinging beam may turn relative to the plow carrier.

Other and more detailed objects and advantages will appear hereinafter.

Referring to the drawings:

Figure 1 is a perspective view showing a wheel-mounted two-way plow embodying the present invention.

Figure 2 is a side elevation, partly broken away, showing the rear wheel assembly.

Figure 3 is an elevation thereof.

Figure 4 is a top plan view, partly broken away.

Figure 5 is a side elevation showing the rear wheel assembly in operating position.

Figure 6 is an end view in diagrammatic form showing the manner of turning of the rear wheel assembly with the plow carrier.

Figure 7 is an exploded view, partly broken away, showing the manner of mounting of the crossbar bracket upon the rearward end of the longitudinal beam.

Figure 8 is a side elevation similar to Figure 2 showing a modified form of my invention.

Figure 9 is a top plan view thereof.

Figure 10 is a view similar to Figure 8 showing the action of the rear wheel assembly in service.

Figure 11 is a perspective view showing another modification of my invention.

Figure 12 is a longitudinal sectional view partly broken away showing details of construction of the device of Figure 11.

Figure 13 is a sectional elevation taken substantially on the line 13—13 as shown in Figure 12.

Figure 14 is a diagram showing the hydraulic interconnection of the power cylinder assemblies for turning the carrier and for swinging the rear wheel assembly.

The mobile frame generally designated 10 may be mounted on a pair of ground wheels 11 or may be carried directly on power operated draft linkage of a tractor. In the wheel-supported type illustrated the frame includes parallel side members 12 connected by parallel fore and aft transverse members 13. The frame includes a stationary longitudinal beam 14 which extends rearwardly from the rear cross member 13 of the frame 10. Power means are provided for raising and lowering the ground wheels 11 with respect to the frame 10 and, as shown, this means may include the upright power cylinders 15 which are pivoted on the A frame assembly 16 and are arranged to operate crank arms 17. The crank arms are pivoted on the frame 10 and carry the ground wheels 11 on their outer swinging ends. A draft tongue 18 of any suitable type may be pivotally connected to the frame 10 and arranged to be drawn by a tractor or other towing vehicle.

A carrier 19 is mounted to turn on the longitudinal beam 14 and upon this carrier are fixed one or more right hand plows 20 and left hand plows 21. The plows are attached to the carrier by means of vertical plow beams 8 and bolts 9. Power means are provided on the frame 10 for turning the carrier 19 and plows relative to the longitudinal beam 14. As shown in the drawings, this power means includes a double acting power cylinder 22 having coaxial piston rods 23 projecting from opposite ends thereof. A sheave 24 is rotatably mounted on each of the projecting piston rods 23. A flexible cable 25 passes around each of the sheaves 24 and around the spooling drum 26 provided on the carrier 19. The opposed ends of the cable 25 are fixed to a stationary bracket 27 carried on the frame 10. From this description it will be understood that actuation of the power cylinder 22 in one direction serves to extend one of the piston rods 23 and retract the other so that the cable 25 acting on the drum 26 serves to turn the carrier 19 on the longitudinal beam 14. Actuation of the power cylinder 22 in the other direction extends the other piston rod 23 and thereby rotates the carrier 19 in the other direction.

In accordance with my invention, I provide a rear wheel assembly generally designated 28 which is mounted on the carrier 19 and which serves to regulate the depth of cut of the plows 20 and 21. As shown in the drawings, this rear wheel assembly 28 includes a swinging post 29 which is mounted for swinging movement about a pivot pin 30 fixed to the plate 31 so as to provide a pair of arm members, each of rigid construction, with one arm extending upwardly from the pivot pin 30 and the other extending downwardly therefrom. The plate 31 is bolted to the rear portion of the carrier 19. A suitable retainer element 32 may be provided to prevent disassembly of the post 29 from the pivot pin 30. Ground wheels 33 and 34 are rotatably mounted at opposite ends of the swinging post 29. The ground wheel 34 rolls on the ground when the left hand plows 21 are active and the ground wheel 33 rolls on the ground when the right hand plows 20 are active.

A stop lug 35 is fixed relative to the swinging post 29 by means of the arcuate connecting piece 36. A bracket 37 having laterally extending arms 38 and 39 is provided with a central opening 40 for reception of the rearward end of the longitudinal beam 14. The bracket 37 encircles the rearward end of the beam 14 and is fixed thereto by means of a pin 41 which extends through aligned ears 42 on the bracket 37 and through apertures 43 provided in the beam 14. The bracket 37 is thus removably fixed on the beam 14. The lug 35 on the post 29 engages the bracket arm 39 to limit counterclockwise motion of the post 29 when the parts are in the position shown in Figure 2. The lug 35 engages the bracket arm 38 to limit turning movement of the post 29 when the carrier 19 is turned to bring the right hand plows 20 into ground-engaging position.

The function of the lug 35 and bracket arms 38 and 39 is to insure that the ground wheel which is active shall be positioned to the rear of the ground wheel which is inactive. Thus, if the parts 35, 38 and 39 were omitted the lower ground wheel might move forwardly relative to the frame 10 instead of rearwardly as is necessary for proper functioning of the apparatus.

Resilient means, such as the coil springs 44, may be provided for resiliently urging the swinging post 29 to assume a neutral transverse position with respect to the carrier 19. Each of these coil springs 44 has one end secured to a boss 51 and the other end secured to one of a pair of lugs 45 fixed on the swinging post 29. The springs 44 serve to urge the post 29 to return to a neutral position whenever the longitudinal beam 14 is raised to bring the plows out of the ground.

Means are provided for limiting the extent of angular movement of the swinging post 29 in order to regulate the depth of cut of the plows 20 and 21. As shown in the drawings, this means includes a head 46 fixed on the plate 31 and provided with an arcuate series of spaced apertures 47. Stop pins 49 and 50 are provided which may be secured in any one of the apertures 47. When the pins are mounted in the two apertures at the ends of the series the extent of angular movement of the swinging post 29 is held to a minimum.

The side surfaces 48 on the swinging post 29 engage the pins in the apertures 47 to limit swinging movement of the post about the pivot 30. In Figure 5 the swinging post 29 is shown in engagement with the stop pin 50 to limit swinging motion of the post. The ground wheel 34 thereupon serves to regulate the depth of cut of the plows 21. When the carrier 19 is turned to bring the plows 20 into operative position the ground wheel 33 acts in a similar manner to limit the depth of cut. In the latter position the swinging post 29 engages the stop pin 49. The depth of cut may be changed by shifting the stop pins 49 and 50 into other apertures 47. It will be seen that the surface 48 of each of the two arms formed by the swinging post 29 engages its respective stop member on the side thereof opposite the side facing the other stop member.

In operation, the two-way plow device is towed behind a tractor (not shown) with the beam 14 and carrier 19 in elevated position as shown in Figure 1. In this position the plows are raised out of contact with the earth. When the device is in position at one end of the field ready to begin plowing operations, the power cylinders 15 are actuated to lower the frame and carrier 19 to bring the plows 21 into earth-engaging position. As the device is towed forwardly by the tractor the left hand plows 21 engage the earth and the ground wheel 34 rolls on unplowed ground adjacent the furrow cut by the rearmost of the plows 21. When the ground wheel 34 engages the ground during forward motion of the device the post 29 is caused to swing about its pivot 30 until it engages the stop pin 50, thereby limiting the depth of cut of the plows 21.

When the far end of the field is reached after plowing a left hand furrow, the power cylinders 15 are actuated to raise the frame 10, beam 14, carrier 19 and plows 21 out of the ground. At the same time the springs 44 return the swinging post 29 to its neutral position as shown in Figure 1. The tractor then turns the two-way plow device around and positions it adjacent the left hand furrow ready for the return trip along the furrow just cut. The double acting power cylinder 22 is then operated to rotate the carrier 19 through approximately one-half revolution relative to the longitudinal beam 14. This action lowers the right hand plows 20 and raises the left hand plows 21 into an inoperative position. The power cylinders 15 are then actuated to lower the frame and carrier to bring the plows 20 into engagement with the soil and forward motion of the tractor is begun. The ground wheel 33 rolls on the unplowed ground adjacent the furrow being cut by the rearmost plow 20 and the swinging post 29 is tilted so that the ground wheel 33 is positioned to the rear of the inoperative elevated ground wheel 34. The post 29 strikes the stop pin 49 to limit swinging movement of the post and thereby regulates the depth of cut of the right hand plow 20. When the far end of the field is reached after making a right hand furrow the beam 14, carrier 19 and plows are again elevated so that the plows 20 clear the ground. The springs 44 return the post 29 to the neutral position, the carrier 19 is turned by means of the double acting power cylinder 22 to raise the plows 20 to the inoperative position. The tractor and two-way plow device are then turned around and the cycle is repeated.

The modified form of my invention shown in Figure 8 employs a power cylinder assembly 60 for swinging the post 29a about the pivot 30a which connects it to the carrier 19a. The cylinder assembly 60 includes the cylinder housing 61 which is pivotally connected to a bracket 62 on the carrier 19a by means of the pivot pin 63. The piston rod 64 extending from the housing 61 is pivotally connected to the post 29a by means of the pivot pin 65. Hydraulic lines 66 and 67 communicate with opposite ends of the housing 61. When hydraulic fluid under pressure is admitted through line 66 and exhausted through line 67 the piston 68 connected to the rod 64 moves downward to the right as viewed in Figure 8 to swing the post 29a in a clockwise direction about the pivot 30a. The ground wheels 33a and 34a then take the position shown in full lines in Figure 10. When hydraulic fluid under pressure is admitted through line 67 and exhausted through line 66 the piston rod 64 is extended and the post 29a moved in a counterclockwise direction to bring the ground wheels 33a and 34a to the position shown in phantom lines in Figure 10. In this form of my invention there is no counterpart for the lug 35 and bracket arms 38 and 39 illustrated in Figures 1–7. The bracket 37a serves only as a removable thrust collar. The angular position of the swinging post 29a is under positive control of the operator at all times. The hydraulic lines 66 and 67 extend forward along the carrier and if desired may be hydraulically interconnected as shown in Figure 14 with the power cylinder assembly 22a which turns the carrier 19 with respect to the frame 10. Such hydraulic interconnection of the power cylinder assemblies 22 and 60 causes the post 29a to move the ground wheel 33a forwardly when the left-hand plows 21 are brought into operative position, and to move the ground wheel 34a forwardly when the right-hand plows 20 are brought into operative position.

As shown in Figure 14 the hydraulic lines 66 and 90 may be connected to the common supply line 91 and the hydraulic lines 67 and 92 may be connected to the common supply line 93. The common supply lines 91 and 93 extend from the plow assembly to control valves and hydraulic pump (not shown) customarily mounted on the tractor. When hydraulic fluid under pressure is supplied through line 91 and exhausted through line 93 the double piston rod 23 is shifted to the left and the piston rod 65 is extended. Similarly, when hydraulic fluid under pressure is supplied through line 93 and exhausted through line 91 the double piston rod 23a is shifted to the right and the piston rod 64 is retracted.

The depth control plate 31a may be fixed to the rear plow beam 8 by means of suitable threaded connections 69, and limit stops 70 may be secured in the series of apertures 71 provided on the plate 31a. These limit stops 70 may be placed as desired to limit the extent of swinging movement of the post 29a and thereby regulate the depth of cut of the plows.

In Figures 11–13 I have shown my improved rear wheel assembly in connection with a modified form of two-way plow. The plow frame 10a may be mounted on a pair of ground wheels 11a or may be carried directly on power operated draft linkage of a tractor. In the wheel supported type illustrated the frame includes parallel side members 12a connected by fore and aft transverse members 13a. Power means are provided for raising and lowering the ground wheels 11a with respect to the frame 10a and, as shown, this means may include the upright power cylinders 15a which are pivoted on the A frame assembly 16a and are arranged to operate crank arms 17a. The crank arms are pivoted on the frame 10a and carry the ground wheels 11a on their outer swinging ends. A draft tongue 18a of any suitable type may be pivotally connected to the frame 10 by means of the pivot pins 72 which are mounted in the parallel crossbars 73 extending between side members 12a. The tongue 18a may be provided with an upper ring 74 and a lower ring 75 which span the curved forward member 76 and the straight transverse member 77 mounted on the frame 10a. The upper ring 74 may be connected to an offset part 78 by means of threaded connections 79, and in the same manner the lower ring 75 may be connected to an offset part 80 by means of threaded connections 81. The tongue 18a may be provided with rollers 86 which roll on the arcuate member 76 at the forward end of the frame 10a.

The plow carrier 82 may be solid or tubular in form and is mounted for rotation on the frame 10a. As shown in Figure 12 of the drawings, the carrier 82 may be mounted in axially spaced bearings 83 and 84 which are carried on crossmembers 77 and 13a fixed to the frame. A nut 85 secured to the forward end of the carrier 82 serves to prevent disassembly of the carrier from its supporting bearings 83 and 84. The vertical plow beams 8a are fixed to the carrier 82, and the right-hand plows 20a and the left-hand plows 21a are fixed on these plow beams 8a. Means are provided for turning the carrier 82 to bring either the right-hand plows 20a or the left-hand plows 21a into operative position. This means is preferably of the same type shown in that form of the invention illustrated in Figures 1–7. This means includes the double-acting power cylinder assembly 22a having the pulleys or sheaves 24a mounted on opposite ends of the piston rod 23a. The flexible cable 25a has its ends fixed to the stationary bracket 27a, and this cable passes around the sheaves 24a and around the drum 26a fixed on the carrier 82.

The rear wheel assembly employed in connection with this form of two-way plow is substantially the same as that illustrated in Figures 8–10. Thus, the swinging post 29a is pivoted to the carrier 82 at 30a and the position of the post is controlled by the power cylinder assembly 60 and limit stop elements provided on the depth control plate 31a. The plate 31a is fixed to the rear plow beam 8a. The hydraulic lines 66 and 67 extend forwardly along the carrier 82, and if desired may be hydraulically interconnected with the power cylinder 22a so that the power cylinders operate in dependent fashion.

The general scheme of operation of the modified forms of the two-way plow devices shown in Figures 8–10 and Figures 11–13 is substantially the same as that described above in connection with the form of the invention shown in Figures 1–7. The chief difference is that the swinging post carrying the depth control wheels is shifted by hydraulic means instead of by contact of these depth control wheels with the ground surface.

Having fully described my invention, it is to be understood that I do not wish to be limited to the details herein set forth, but my invention is of the full scope of the appended claims.

I claim:

1. In a two-way plow assembly, the combination of: a frame having a stationary longitudinal beam, a carrier turnably mounted on the beam and provided with a right-hand plow and a left-hand plow, power means on the frame for turning the carrier to bring either plow into operative position, a rear wheel assembly mounted on the carrier, said assembly including a swinging post pivotally connected to the carrier, a pair of ground wheels each turnably mounted at opposed ends of said post, cooperating stop means on the post and longitudinal beam to limit swinging movement of the post about its pivot in one direction in either operative position of the carrier, additional adjustable means for limiting pivotal movement of the post in the other direction in either operative position of the carrier, whereby one of the ground wheels on the rear wheel assembly controls the depth of cut of the right-hand plow and the other ground wheel controls the depth of cut of the left-hand plow.

2. In a two-way plow assembly, the combination of: a mobile frame having a stationary longitudinal beam extending from the rear thereof, a carrier turnably mounted on the beam and provided with a right hand plow and a left hand plow, power means on the mobile frame for turning the carrier to bring either plow into operative position, a rear wheel assembly mounted on the carrier, said assembly including a swinging post pivotally connected to the carrier, a pair of ground wheels each turnably mounted at opposed ends of said post, a stop element fixed relative to said post in a symmetrical position between said wheels, a bracket having laterally extending arms and fixed to the rear end of said longitudinal beam, the stop element engaging one of said arms in either of the operative positions of the carrier to limit swinging movement of the post about its pivot in one direction, and additional adjustable means positioned to cooperate with the post in each operative position of the carrier for limiting pivotal movement of the post in the other direction, whereby one of the ground wheels on the real wheel assembly controls the depth of cut of the right hand plow and the other ground wheel controls the depth of cut of the left hand plow.

3. In a two-way plow assembly, the combination of: a mobile frame having a stationary longitudinal beam extending from the rear thereof, a carrier turnably mounted on the beam and provided with a right hand plow and a left hand plow, power means on the mobile frame for turning the carrier to bring either plow into operative position, a rear wheel assembly mounted on the carrier, said assembly including a swinging post pivotally connected to the carrier for movement about an axis transverse to said longitudinal beam, a pair of ground wheels each turnably mounted at opposed ends of said post and each positioned to roll upon unplowed ground, stationary elements mounted symmetrically at the rear end of the longitudinal beam, a single stop element on the post adapted to engage either of said stationary elements to limit pivotal movement of the post in one direction, and adjustable stop means for limiting the pivotal movement of the swinging post in the other direction, whereby one of the ground wheels on the rear wheel assembly controls the depth of cut of the right hand plow and the other ground wheel controls the depth of cut of the left hand plow.

4. In a two-way plow assembly, the combination of: a frame having a stationary longitudinal beam, a carrier turnably mounted on the beam and provided with a right hand plow and a left hand plow, power means on the frame for turning the carrier to bring either plow into operative position, a rear wheel assembly mounted on the carrier, said assembly including a swinging post pivotally connected to the carrier, a pair of ground wheels each turnably mounted at opposed ends of said post, cooperating stop means on the post and longitudinal beam to limit swinging movement of the post about its pivot in one direction in either operative position of the carrier, additional adjustable means for limiting pivotal movement of the post in the other direction in either operative position of the carrier, resilient means normally acting to maintain the first said stop means in engagement whereby one of the ground wheels on the rear wheel assembly controls the depth of cut of the right hand plow and the other ground wheel controls the depth of cut of the left hand plow.

5. In a two-way plow assembly, the combination of: a mobile frame having a stationary longitudinal beam extending from the rear thereof, a carrier turnably mounted on the beam and provided with a right hand plow and a left hand plow, power means on the mobile frame for turning the carrier to bring either plow into operative position, a rear wheel assembly mounted on the carrier, said assembly including a swinging post pivotally connected to the carrier for movement about an axis transverse to said longitudinal beam, a pair of ground wheels each turnably mounted at opposed ends of said post and each positioned to roll upon unplowed ground, a stop element fixed relative to said post in a symmetrical position between said wheels, a bracket having laterally extending arms and fixed to said longitudinal beam, the stop element engaging one of said arms in either of the operative positions of the carrier to limit swinging movement of the post about its pivot in one direction, additional adjustable means positioned to cooperate with the post in each operative position of the carrier for limiting pivotal movement of the post in the other direction, resilient means normally acting to maintain the stop element in engagement with one of the bracket arms, whereby one of the ground wheels on the rear wheel assembly controls the depth of cut of the right hand plow and the other ground wheel controls the depth of cut of the left hand plow.

6. In a two-way plow assembly, the combination of: a frame; a carrier turnably mounted on the frame and provided with a right-hand plow and a left-hand plow; power means on said frame for turning said carrier selectively to a position in which said right-hand plow is operative and to a position in which said left-hand plow is operative; and means for regulating the depth of cut of said plows including a pair of arms, each of rigid construction, pivotally mounted on said carrier adjacent its rearward end for swinging movement together in a plane which is vertical in both operative positions of said carrier, a ground wheel rotatably secured on one end of each of said arms for rotation only about an axis transverse to said plane, each of said wheels being laterally offset with respect to said plows in order to roll on unplowed ground, and a plate secured to said carrier so as to be in substantially parallel relation to said plane, said plate carrying spaced adjustable stop members positioned rearwardly of the point of pivotal attachment of said arms to said carrier, one of which engages one of said arms to control the depth of cut of said right-hand plow and the other of which engages the other of said arms to control the depth of cut of said left-hand plow, each of said arms being arranged to engage its respective stop member on the side thereof opposite the side facing of the other stop member.

7. The plow assembly of claim 6 in which said plate is provided with a plurality of apertures and said stop members are mounted in a selected pair of said apertures.

8. The plow assembly of claim 6 in which power means is secured between said carrier and one of said arms for moving said arms in either direction until a selected stop member is engaged.

References Cited in the file of this patent

UNITED STATES PATENTS

| 1,491,884 | Puech | Apr. 29, 1924 |
| 2,179,877 | Martin | Nov. 14, 1939 |
| 2,625,090 | Pursche | Jan. 13, 1953 |

FOREIGN PATENTS

| 49,222 | Germany | of 1889 |
| 646,665 | France | July 17, 1928 |